US008755977B2

(12) United States Patent
Furem et al.

(10) Patent No.: US 8,755,977 B2
(45) Date of Patent: Jun. 17, 2014

(54) METHOD AND SYSTEM FOR PREEMPTIVE LOAD WEIGHT FOR MINING EXCAVATING EQUIPMENT

(71) Applicants: Kenneth Furem, Cumming, GA (US); Daniel W. Robertson, Cumming, GA (US); Julian D. Jaeger, Atlanta, GA (US)

(72) Inventors: Kenneth Furem, Cumming, GA (US); Daniel W. Robertson, Cumming, GA (US); Julian D. Jaeger, Atlanta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/919,020

(22) Filed: Jun. 17, 2013

(65) Prior Publication Data

US 2014/0088838 A1  Mar. 27, 2014

Related U.S. Application Data

(60) Provisional application No. 61/704,110, filed on Sep. 21, 2012.

(51) Int. Cl.
*G01G 19/00* (2006.01)
*G06F 17/10* (2006.01)

(52) U.S. Cl.
USPC .................. 701/50; 702/174; 37/348; 37/379; 703/2

(58) Field of Classification Search
USPC .............. 701/50; 702/173, 174; 37/348, 379, 37/444; 703/2
See application file for complete search history.

(56) References Cited

U.S. PATENT DOCUMENTS

| 5,321,637 | A | 6/1994 | Anderson |
| 6,157,889 | A * | 12/2000 | Baker ..................... 701/124 |
| 7,574,821 | B2 | 8/2009 | Furem |
| 7,578,079 | B2 | 8/2009 | Furem |
| 7,832,126 | B2 | 11/2010 | Koellner et al. |

OTHER PUBLICATIONS

PCT International Search Report mailed Dec. 2, 2013 corresponding to PCT International Application No. PCT/US2013/060525 filed Sep. 19, 2013 (8 pages).

* cited by examiner

*Primary Examiner* — Russell Frejd

(57) ABSTRACT

Provided is a method and a system for preemptively determining a load weight for mining excavation equipment. Specifically, provided is a method in which an excavation surface is scanned to generate an excavation surface profile, an excavation plan is selected for the excavation surface profile, the excavation plan for the excavation surface profile is executed on the excavation surface utilizing a pre-emptive load weighing algorithm based on a plurality of drive signals of the mining excavation equipment, and a volume of a material to be excavated by the mining excavation equipment is determined based at least on the plurality of drive signals, the plurality of derivatives of drive signals, and the excavation surface profile.

20 Claims, 5 Drawing Sheets

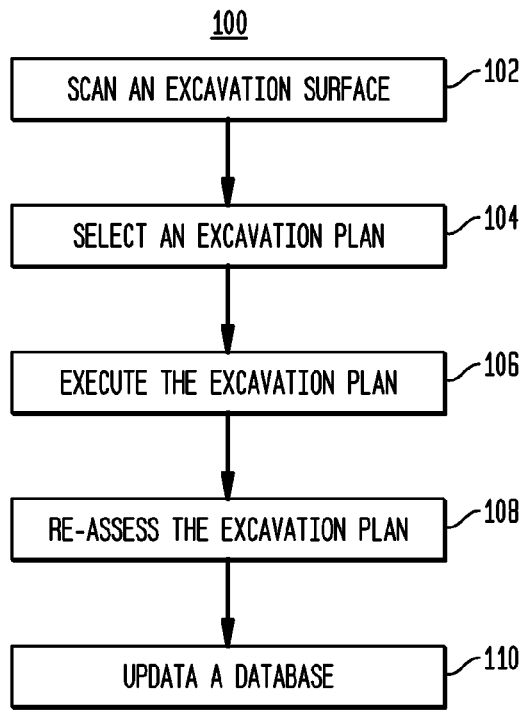
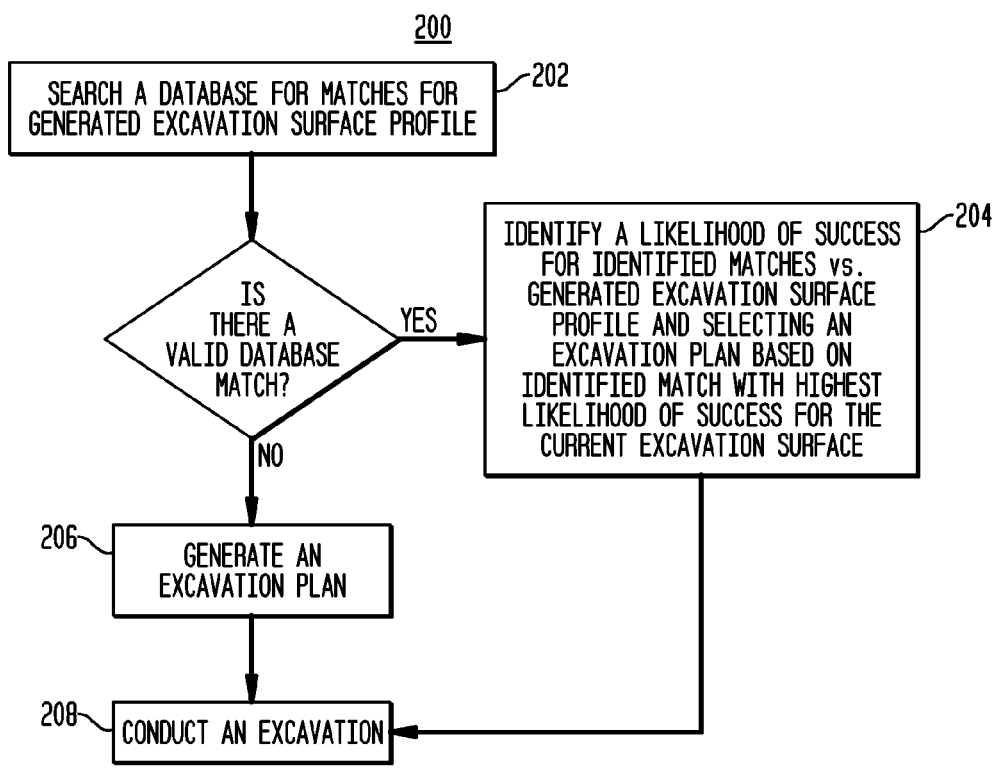

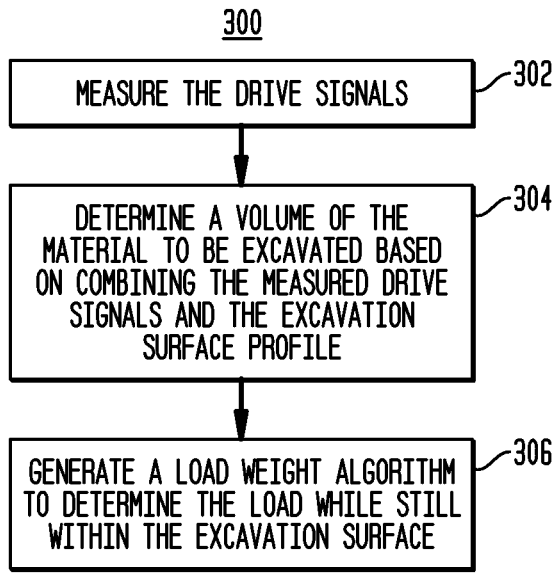
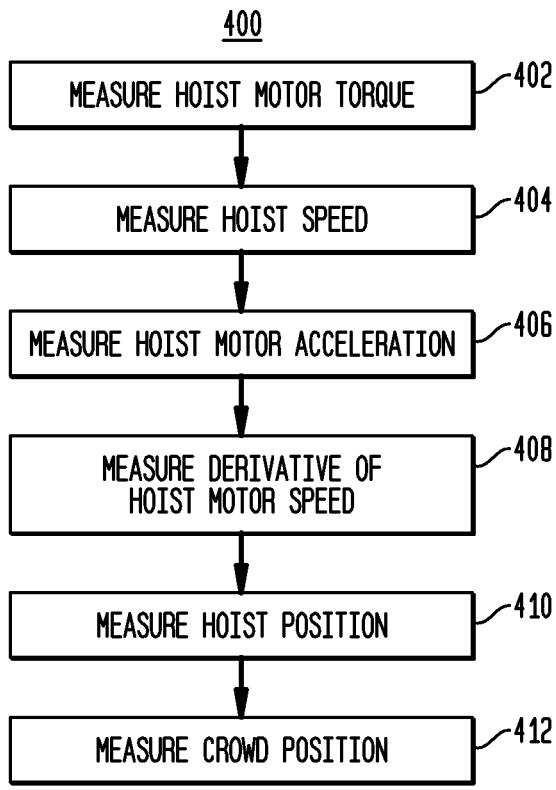

METHOD AND SYSTEM FOR PREEMPTIVE LOAD WEIGHT FOR MINING EXCAVATING EQUIPMENT

CROSS REFERENCE TO RELATED APPLICATION

This application claims benefit, under 35 U.S.C. §119(e), of U.S. Provisional Application Ser. No. 61/704,110, filed 21 Sep. 2012, the entire contents and substance of which is hereby incorporated by reference.

BACKGROUND

The disclosure relates to heavy equipment for surface mine field loading operations such as human-operated and/or autonomous power shovels, drag lines, and the like, and more particularly, systems used on such equipment to measure the net weight of excavated material in each load.

In large scale surface mining operations, excavating equipment of immense proportions is used to excavate and load material. Excavation is usually performed by power shovels with a bucket capacity of dozens of tons per scoop.

Measurement systems have been developed to determine the net weight of material in the power shovel bucket as it is transferred to the truck. However, upon determining that the net weight of the load exceeds required weight, the excavation equipment may be forced to dump a portion of the excavated material, causing the increase of an excavation cycle time and, thus, higher overall labor and maintenance costs.

BRIEF DESCRIPTION OF THE DRAWINGS

FIG. 1 illustrates an exemplary flow chart for preemptively determining a load weight for mining excavation equipment, in accordance with an embodiment;

FIG. 2 illustrates an exemplary method for selecting an optimal excavated area profile, in accordance with an embodiment;

FIG. 3 illustrates an exemplary method for measuring the drive signals of an excavating equipment, in accordance with an embodiment;

FIG. 4 illustrates an exemplary method of the drive signals measuring, in accordance with an embodiment;

SUMMARY

Figure 5:
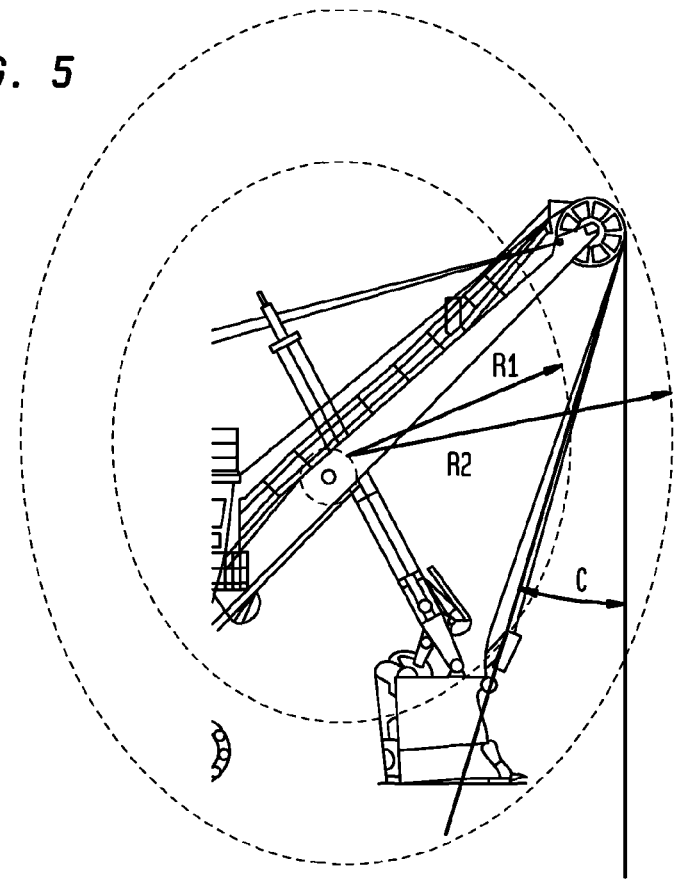
FIG. 5 illustrates exemplary excavating equipment.

Provided is a method and a system for preemptively determining a load weight for mining excavation equipment. Specifically, provided is a method in which an excavation surface is scanned to generate an excavation surface profile, an excavation plan is selected for the excavation surface profile, the excavation plan for the excavation surface profile is executed on the excavation surface utilizing a pre-emptive load weighing algorithm based on a plurality of drive signals of the mining excavation equipment, and a volume of a material to be excavated by the mining excavation equipment is determined based at least on the plurality of drive signals, a plurality of derivatives of drive signals, a plurality of calculated signals, and the excavation surface profile. In one embodiment, scanning the excavation surface to generate an excavation surface profile comprises scanning an environment surrounding the excavation surface using a plurality of sensors and analyzing data generated by the plurality of sensors utilizing a pattern classification and recognition algorithm where scanning an environment surrounding the excavation surface using a plurality of sensors comprises determining a topography that may interfere with activity of the mining excavation equipment, and determining one or more objects that may interfere with activity of the mining excavation equipment, and where analyzing data generated by the plurality of sensors utilizing a pattern classification and recognition algorithm comprises at least one of a decision tree, a Bayesian network, a neural network, a Gaussian process, an independent component analysis, a self-organized map, or a support vector machine. In one embodiment, selecting an excavation plan for the excavation surface profile comprises searching a database containing a plurality of predetermined excavation plans for one of more excavation plans that match the excavation surface profile, in response to identifying the one or more excavation plans that match the excavation surface profile, calculating a likelihood of success for each of the one or more excavation plans that match the excavation surface profile against the excavation surface profile, and selecting an excavation plan having a highest calculated likelihood of success from the one of more excavation plans that match the excavation surface profile, wherein the selecting an excavation plan having a highest calculated likelihood of success from the one of more excavation plans that match the excavation surface profile comprises, in response to failing to identify one or more excavation plans in the database that match the excavation surface profile, generating an excavation plan based on the excavation surface profile for the excavation surface, and storing generated excavation plan in the database. In one embodiment, the executing the excavation plan for the excavation surface profile on the excavation surface utilizing a pre-emptive load weighting algorithm based on a plurality of drive signals of the mining excavation equipment comprises measuring the plurality of drive signals of the mining excavation equipment, where the measuring the plurality of drive signals of the mining excavation equipment comprises measuring a hoist motor torque and measuring a hoist motor acceleration by comparing a first hoist motor speed associated with a first time to a second hoist motor speed associated with a second time, wherein the first time precedes the second time. In one embodiment, a load of the material in a bucket of the mining excavation equipment is determined while the bucket is within the excavation surface by determining an effect of an excavating operation on at least one of the plurality of drive signals, where a load of the material in a bucket of the mining excavation equipment is determined by determining a position of the mining excavation equipment with respect to the excavation surface, a derivative of a hoist motor speed, determining a hoist position, determining a crowd position, and determining a position of the bucket. In one embodiment, determining a load of the material in a bucket of the mining excavation equipment while the bucket is within the excavation surface further comprises determining a decrease in the hoist motor speed relative to an amount of the material in the bucket of the mining excavation equipment.

In one embodiment, an additional load of the material in the bucket of the mining excavation equipment is determined as a consequence of the material falling into the bucket by detecting, by a scanner, the material falling into the bucket and detecting an additional increase of the material in the bucket.

DETAILED DESCRIPTION

Provided is a method and a system for preemptively determining a load weight for mining excavation equipment.

FIG. 1 illustrates an exemplary method 100 for preemptively determining a load weight for mining excavation equipment, according to an embodiment. At step 102, an excavating surface can be scanned to generate a profile of the excavating surface. The excavating surface can be scanned with the use of a plurality of sensors adapted to provide a scan of a surrounding environment. The plurality of sensors can be locally mounted on the mining excavating equipment or remotely mounted. Remotely mounted sensors can be communicatively coupled to the equipment via wired and/or wireless transceivers.

The scan can comprise determining a plurality of parameters, defining the excavating surface, that may include: an angle of repose of material to be mined and/or extracted by the shovel, a particle size distribution of a pile of earthen material, a largest rock in the pile, objects and/or topography that can interfere with activities of the shovel, and/or vehicles in the area of the shovel and/or haulage machines associated with the shovel.

Information provided by the plurality of sensors can be analyzed utilizing a pattern classification and/or recognition algorithm such as a decision tree, Bayesian network, neural network, Gaussian process, independent component analysis, self-organized map, and/or support vector machine, etc. The algorithm can facilitate performing tasks such as pattern recognition, data extraction, classification, and/or process modeling, etc. The algorithm can be adapted to improve performance and/or change its behavior responsive to past and/or present results encountered by the algorithm.

The algorithm can be adaptively trained by presenting it examples of input and a corresponding desired output. For example, the input may be a plurality of sensor readings associated with an identification of a detected object or profile. The algorithm can be trained using synthetic data and/or providing data related to the component prior to previously occurring failures. The algorithm can be applied to almost any problem that can be regarded as pattern recognition in some form. In certain exemplary embodiments, the algorithm can be implemented in software, firmware, and/or hardware, etc.

It is to be understood that the plurality of sensors, such as proprioceptive sensors, responsible for monitoring self maintenance and controlling internal status can provide a wide variety of information regarding the excavating equipment, such as a measured motor power and/or torque associated with the excavating equipment and the like to determine and/or optimize an excavating procedure. Information from the plurality of exteroceptive (e.g., proximity) sensors can be used to calculate and/or determine a two-dimensional and/or a three-dimensional model of the excavating surface. The two-dimensional and/or a three-dimensional model of the excavating surface can be prompted to operators of an excavating equipment or autonomous control system of the excavating equipment.

Existing methods for generating the two-dimensional and/or a three-dimensional excavation surface profiles and excavation cycles result in generation of large arrays of information stored in databases. Searching for optimal excavation surface profile among such large arrays adds complexity to a system. Therefore, a novel method for generating excavation surface profiles and excavation cycles is provided. In an embodiment, the plurality of parameters defining the excavating surface can be presented as an equation defined using non-linear least squares regression.

Presenting excavation profiles in such a manner enables the excavation surface profile and excavating trajectory to be categorized by the few variables that define the equations. Excavation surface profiles presented as equations reduce complexity of the system, reduce the processing power required to generate the excavation surface profiles and/or excavation cycles, and enables excavation surface profile identification essentially in real-time. In one embodiment, an equation for defining excavation surface profile is a multi-order, non-linear polynomial equation. Specifically, the least squares approach to solve for the best fit equation may be utilized to match a given sample of data points representing the excavation surface profile and excavation trajectory. For example, equation $y=0.0586x^2+0.1227x+0.5264$ may be used to define the excavation surface profile, and equation $y=0.139x^2-0.8678x+1.4306$ may be used to define the excavation trajectory.

Returning to FIG. 1, at step 104, an excavation plan for the excavation surface profile is selected. FIG. 2 illustrates an exemplary method for selecting optimal excavation surface profile. The exemplary method of FIG. 2 can be used to generate the excavation surface profile of step 104.

At step 202, a database containing a plurality of predetermined excavation plans for a plurality of surface profiles can be searched to identify an excavation plan that is an optimal match for an excavation surface profile generated during scanning of the excavating surface (e.g., step 102). In an embodiment, the database may include the predetermined excavation plans generated during prior excavation projects. In other embodiment, the database may include the predetermined excavation plans that were gathered from a plurality of new trial runs. If one or more matching excavation plans for the generated excavation surface profile is located in the database, the method 200 proceeds to step 204 in which a likelihood of success for identified matches is determined against the generated excavation surface profile and an excavation plan is selected based on identified match with highest likelihood of success for the current excavation surface. In an embodiment, when faced with a new excavation surface profile, the appropriate excavating trajectory can be selected based on the specified excavating criteria. As several possible trajectories can be identified, an excavation plan associated with the highest probability of success in relation to a given excavating surface can be selected. It is to be understood that the likelihood of success may depend on several parameters applicable to the generated excavation surface profile. For example, if excavation needs to be completed within a very short period of time with disregards of energy efficiency, the excavation plan having high likelihood of success for this project may exclude as an attribute an energy efficiency excavation. In another example, if excavation needs to be completed with energy efficiency, the excavation plan having high likelihood of success for this project may exclude as an attribute as excavation speed.

If the optimal excavation plan for the generated surface profile is not located in the database, the method 200 proceeds to step 206 at which an excavation plan is generated based the generated excavation surface profile for the current excavating surface based on the plurality parameters determined during scanning at step 102. In one embodiment, during scanning an excavating trajectory is used in order to calculate how much material has to be excavated using the generated excavation plan. Specifically, an excavation trajectory is used to subtract an excavation trajectory equation from an excavation surface equation resulting in a difference equation. Then, intersection points of the difference equation are determined using a quadratic formula and integrated the determined intersection points with the excavation surface as bounds.

Returning to FIG. 1, at step 106 an excavation is executed in accordance with a generated excavation for the generated excavation surface profile. In one embodiment, during excavation, a method for pre-emptive load weighing of each load is utilized.

During the excavation, it is desirable to know the amount of material that is in the bucket while it is still in the excavation surface. Existing methods of load weighting through electrical drive signals are disclosed in the U.S. Pat. No. 8,373,078, entitled "System and Method for Load Measuring By Motor Torque," filed on Jul. 1, 2004, and incorporated herein by reference in its entirety. However, these methods can only determine the weight of the load after the bucket has been withdrawn from the excavation surface. In other words, with drive signals alone, or even with strain gauges, it is not possible to determine the load in the bucket while it is still in the excavation surface. Several factors may contribute to errors in the measurement, such as depth in the excavation surface, fragmentation of the digging material, falling material, density of the material, etc.

FIG. 3 illustrates an exemplary method 300 for measuring the drive signals of the excavating equipment such as an electric mining shovel, a dragline, a front end loader, and/or a bucket wheel excavator, etc. At step 302, a plurality of the drive signals can be measured, in accordance with an embodiment.

FIG. 4 illustrates an exemplary method for measuring the drive signals. The exemplary method of FIG. 4 can be utilized to implement step 302 of FIG. 3. At step 402, a hoist motor torque can be measured and/or determined. The hoist motor torque can be measured by a calculation module responsible for reading a plurality of drive signals. The hoist torque sensor can detect, measure, and/or transmit information indicative of a torque related to the hoist motor to a processor.

At step 404, a hoist motor speed can be measured and/or determined by a hoist speed sensor, in accordance with an embodiment. The hoist motor speed can be measured as a speed related to the hoist using a device that can be coupled to a component of the hoist of the excavating equipment mechanically, electro-mechanically, magnetically, and/or optically, etc. It is to be understood that the hoist speed can be measured via, for example, a tachometer. The tachometer can be a mechanical device directly or indirectly coupled to a shaft associated with the hoist, an optical device adapted to determine the speed from a signal reflected from at least one part of the hoist, electrical device adapted to measure an electrical property (such as frequency or slip-speed) related to a rotor speed associated with the hoist, and/or a magnetic device adapted to detect variations in magnetic flux related to the hoist speed, etc.

At step 406, a hoist motor acceleration can be measured and/or determined. In an embodiment, the hoist acceleration can be determined by comparing a first hoist speed associated with a first time to a second hoist speed associated with a second time. The hoist acceleration can be a linear acceleration or an angular acceleration. In case of linear acceleration, the hoist acceleration can represent an acceleration of, for example, the bucket along a line, such as a vertical line. In the case of angular acceleration, the hoist acceleration can represent an acceleration of the hoist motor's rotor or a shaft directly coupled thereto (i.e., without an angular speed change mechanism). The hoist acceleration can be used in estimating the dynamic torque for improved estimation of an excavated material weight in the bucket of the excavating equipment.

At step 408, a derivative of a hoist motor speed can be determined and/or measured. In an embodiment, the hoist motor speed can be measured by using a digital speed encoder. The drive control system receives the hoist motor speed measurements and transmits it to a processor configured to determine the load weight.

At step 410, hoist position can be determined. In an embodiment, the hoist position can be measured by using an absolute position encoder. The Programmable Logic Controller (PLC) system receives hoist position measurements and transmits it to a processor configured to determine the load weight. In one embodiment, a determination of a hoist position may include a determination of a bucket position with respect to the excavating surface (depth, angle, trajectory, and the like).

At step 412, crowd position can be determined. In an embodiment, the crowd position can be measured by using an absolute position encoder. The PLC system receives crowd position measurements and transmits it to a processor configured to determine the load weight. In one embodiment, a determination of the crowd position may include a determination of the bucket position with respect to the excavating surface (depth, angle, trajectory, and the like).

Returning to FIG. 3, at step 304 a volume of the material to be excavated can be determined. In an embodiment, the volume of the material to be excavated can be determined based on combining measured drive signals (e.g., hoist motor torque, hoist motor speed, hoist motor acceleration, derivative of a hoist motor speed, a hoist position, and a crowd position, etc.) and the profile of the excavation surface from which the material is to be excavated. In an embodiment, the volume of material to be excavated can be determined by determining the excavation surface profile and a relative position of the excavating equipment to the excavating surface by using a vision system and, then, determining the volume of the material to be excavated based on a determined excavation trajectory of the excavation equipment.

Determined excavation trajectory can be corroborated by cross referencing an excavation algorithm described in U.S. Pat. No. 7,578,079 entitled "Method for an Autonomous Loading Shovel," incorporated herein by reference in its entirety, and monitoring excavating power, force, energy, torque, speed, and other related signals. In an embodiment, an additional load in the bucket as a consequence of the material falling into the bucket can be determined by combining listed algorithms.

In another embodiment, an additional load in the bucket as a consequence of the material falling into the bucket can also be determined by detecting, by a scanner, the material falling into the bucket and detecting, via a plurality of drive signals, an additional increase of the material in the bucket. It is to be understood that a more precise results can be achieved by combining a plurality of algorithms, where each of the plurality of algorithms is being executed independently.

At step 306, a load weight algorithm can be generated to determine the load of the material in a bucket while it is still in the excavation surface. The load weight algorithm estimates the weight of the material in the bucket of the excavating equipment by determining how the drive signals are affected by the excavating operation. In an embodiment, for a given amount of torque, a given amount of load can cause a decrease in speed, wherein the decrease in speed can be correlated to a certain amount of the material in the bucket of the excavating equipment.

FIG. 5 illustrates exemplary excavating equipment. For example, with the excavating equipment's crowd position assumed to be locked and the hoist accelerating in a circular motion into the excavation surface, the hoist is expected to accelerate so the amount of cutting force, with which the bucket will enter the material in the excavation surface, can be determined by the radius of gyration and the speed which is essentially a moment of inertia. At the moment of contact of the bucket with the excavation surface, the bucket slows down and the rate at which the bucket slows down is a result of how deep the bucket pushes into the material to be excavated. Therefore the correlation of the acceleration versus the amount of torque will give an indication of the mass in the bucket.

Another example, where the excavating equipment's crowd position is not locked, the amount of force is applied differently based on whether the excavating equipment's crowd is pushed into the excavation surface, being pulled from the excavation surface, or being pulled by the hoist. In all listed cases, all necessary calculations are conducted with the use of the gear ratios and the relative geometry of the motions.

Figure 6:
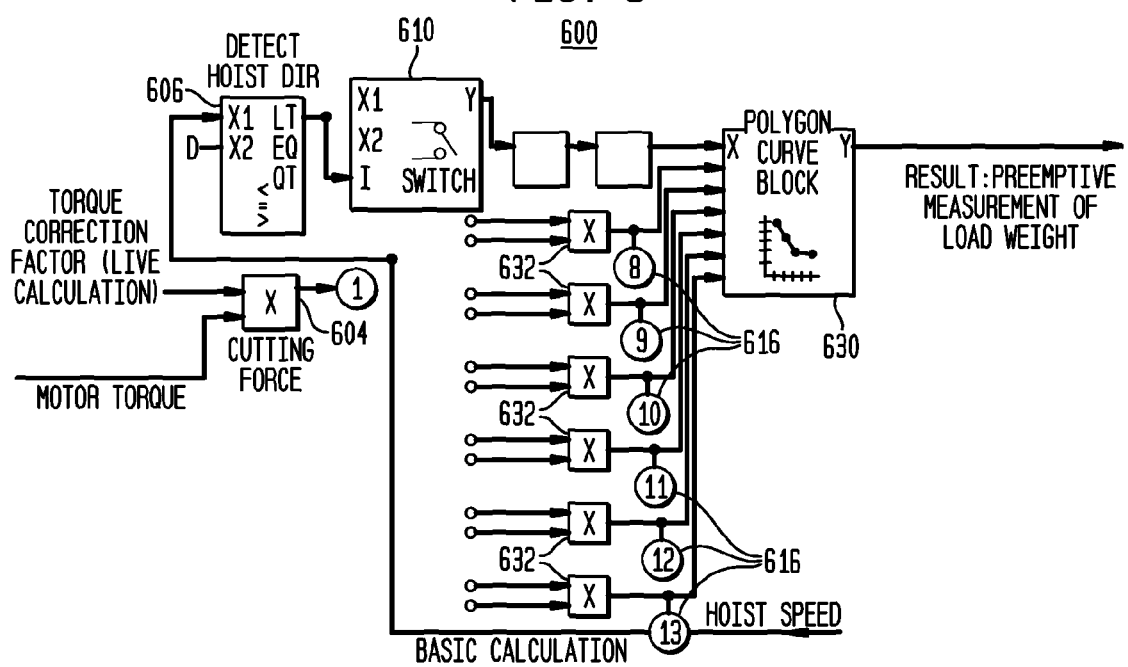
FIG. 6 illustrates an exemplary method for pre-emptive determining of the load weight, in accordance with an embodiment.

FIG. 6 illustrates an exemplary method for pre-emptive determining of the load weight of the material in the bucket of the excavating equipment when the bucket is still in the excavation surface. In an embodiment, the load weight can be determined based on a correlation between the amount of torque and the decrease in speed caused by the amount of the material in the bucket. Specifically, in the exemplary method of FIG. 6 the amount of motor torque can be scaled by a cutting force unit 604 and then propagated to plurality multipliers 632 to calibrate the cutting force calculation results based on a type of the material being excavated.

In the exemplary method of FIG. 6, the hoist direction can also be also detected, by a hoist direction detection unit 606, based on a measurement of the hoist speed in order to determine a derivative of the hoist speed. The derivative of the hoist speed is then can be propagated through a switch 610, as one of the parameters of a polynomial calculation implemented by the polygon curve block 630 to preemptively determining the load weight. The switch 610 is configured to terminate calculation upon detecting that the hoist is lowered. A measured combination of the cutting force and the material calibration 616 can be at least one other parameter for a polynomial calculation implemented by the polygon curve block 630 is. Thus, the derivative of the hoist speed and a measured combination of the cutting force and the material calibration being inputted to the polygon curve block 630 can be used as parameters in an equation defined using non-linear least squares regression to preemptively determine the load weight.

Figure 7:
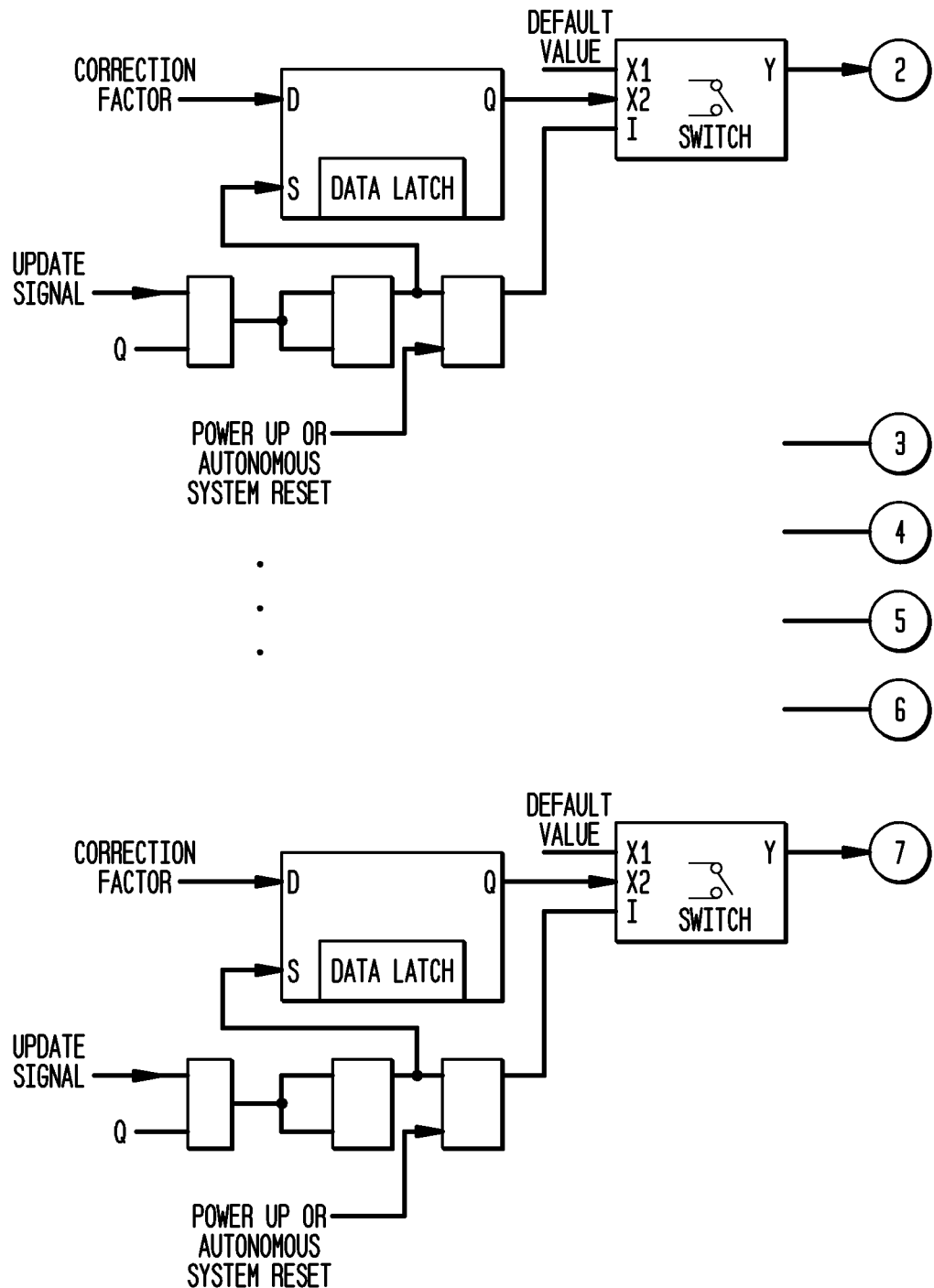
FIG. 7 illustrates an exemplary system of entering re-scaling factors.

FIG. 7 illustrates an exemplary method of entering re-scaling factors in accordance with an embodiment. Re-scaling factors can be used so that the accuracy of the hoist motor torque, hoist motor speed, hoist motor acceleration, derivative of a hoist motor speed, a hoist position, and a crowd position measurements are maintained throughout the exploitation cycle of the excavating equipment. In an embodiment, the re-scaling factors can be adjusted when the excavating equipment is energized, reset, and/or whenever the characteristics of the material in the excavation surface are changed significantly.

Figure 8:
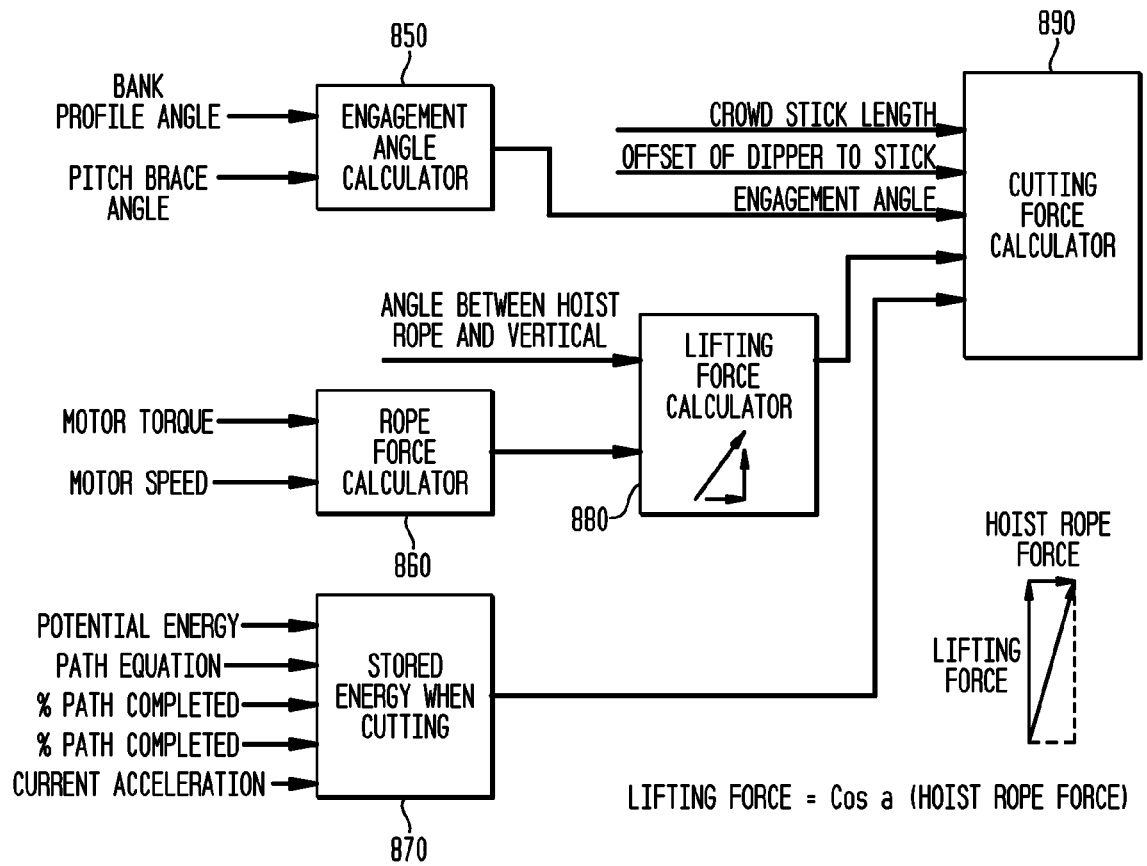
FIG. 8 illustrates an exemplary system for calculating a cutting force.

FIG. 8 illustrates an exemplary system 800 for calculating a cutting force in accordance with an embodiment. The system 800 can be initiated when excavation surface profile angle and pitch brace angle parameters are entered into an Engagement Angle Calculating Unit 850. Motor torque and motor speed parameters can be entered into a Rope Force Calculating Unit 860. In an embodiment, the Rope Force Calculating Unit 860 is adapted to calculate a hoist rope force with an exemplary formula:

$$F_R = (S_{MT} \times R_H \times H_M) - \tau_A$$

where,
$F_R$ is a Rope Force,
$S_{MT}$ is a Motor Torque,
$R_H$ is a Gear Ratio
$H_M$ is a Mechanical Efficiency, and
$\tau_A$ is an Accelerated Torque.

The output from the Rope Force Calculating Unit 860 may be an input to a Lifting Force Calculating Unit 880. At least one other input to the Lifting Force Calculating Unit 880 is an Angle C between Hoist Rope and Vertical as shown in FIG. 5. In an embodiment, a lifting force metric can be calculated by the following formula:

$$\text{Lifting Force} = \cos a (\text{Hoist Rope Force})$$

The system 800 proceeds with a plurality of parameters received from the plurality of sensors being entered into a Stored Energy Calculating Unit 870. The plurality of parameters entered into the Stored Energy Calculating Unit 870 may include a potential energy metric, an excavation path equation, a measurement of a percentage of the path being completed by the excavating equipment, and a metric of a current mechanical mass acceleration.

In an embodiment, the Stored Energy Calculating Unit 870 is adapted for determining stored energy while the excavating equipment is in the process of penetrating the material to be excavated. For example, an output from the Stored Energy Calculating Unit 870 may be an input to the Cutting Force Calculating Unit 890. Other inputs to the Cutting Force Calculating Unit 890 may include a crowd stick length metric, an offset of dipper to stick metric, the engagement angle metric which is an output from the Engagement Angle Calculating Unit 850, and the Lifting Force metric calculated by the Lifting Force Calculating Unit 880.

It is to be understood that information determined by the plurality of sensors and calculating units of FIGS. 6-8 can be wirelessly transmitted to the excavating equipment. In an embodiment, wirelessly transmitted information can be provided to an information device and/or a remote server. The wirelessly received information can be stored in a memory device and/or remotely reported via a client information device. The client information device can render and/or accumulate data across a plurality of excavating machines, haulage machines, hoists, shifts, time periods, operators, supervisors, and/or mines to allow for reporting and/or analysis.

In an embodiment, the excavating equipment and/or hoist can wirelessly receive information, such as weight information, from a remote wireless transmitter associated with, for example, the server and/or the client information device. Information received can, for example, be indicative of whether the material in the excavating equipment bucket should be loaded on the haulage machine. Information received can comprise an index of haulage machines assigned to the excavating equipment, performance related information related to material excavation, and/or repair recommendation related to the excavating equipment, etc.

In a preferred embodiment, by augmenting the drive signals with a vision system, the profile of the excavation surface to be excavated can be determined. By combining the profile of the excavation surface to be excavated with the selected dig profile, the volume of the material being removed can be determined, as well as the rate at which it is being removed. It is to be understood that the vision system can be installed on the excavating equipment or directed at the excavating surface independently from the excavating equipment.

By incorporating that information with the drive signals, the existing load weight algorithms can be augmented to determine the load while it is still in the excavation surface. In an embodiment, the load weight calculated in the excavation surface will be calibrated with the values detected after it has exited the excavation surface. Real-time calibration of the load weight can ensure near immediate auto-correction of the load weight, regardless of the composition of the material being removed.

Returning to FIG. 1, at step 108, the excavation plan is re-assessed in accordance with an embodiment. The results from executing the preferred digging procedure can be compared to past results from alternative digging procedures. If results from the preferred digging procedure are improved, at step 110, a procedure stored in the database can be updated, which can result in adaptive learning and improvement of excavating performance.

As such, an improved system is provided for real-time-measuring a load weight during an excavation before an excavation equipment bucket is withdrawn from an excavated area with the excavated material. A novel method is provided for generating excavated area profiles and excavation cycles, and a novel method is provided for predicting the likelihood of success of a plurality of excavating cycles stored in a database and being applied for any given excavation cycle.

Figure 9:
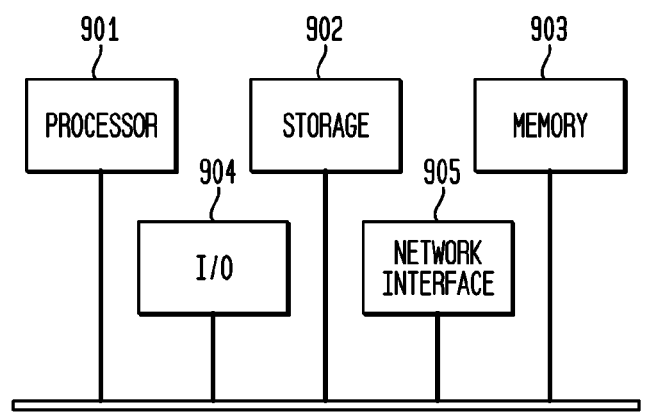
FIG. 9 illustrates an exemplary high-level block diagram of an exemplary computer that may be used for implementing pre-emptive load weight measurement for excavating mining equipment.

FIG. 9 is a high-level block diagram of an exemplary computer that may be used for implementing preemptively determining a load weight for mining excavation equipment. Computer 900 comprises a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the steps of exemplary methods of FIGS. 1-4 and elements of exemplary systems of FIGS. 6-8 can be defined by the computer program instructions stored in memory 903 and/or data storage device 902 and controlled by processor 901 executing the computer program instructions. For example, the computer program instructions can be implemented as computer executable code programmed by one skilled in the art to perform an algorithm defined by the method steps of FIGS. 1-4. Accordingly, by executing the computer program instructions, the processor 901 executes an algorithm defined by the method steps of FIGS. 1-4 and by the system elements of FIGS. 6-8. Computer 900 also includes one or more network interfaces 905 for communicating with other devices via a network. Computer 900 also includes one or more input/output devices 904 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may comprise one or more central processing units (CPUs), for example. Processor 901, data storage device 902, and/or memory 903 may include, be supplemented by, or incorporated in, one or more application-specific integrated circuits (ASICs) and/or one or more field programmable gate arrays (FPGAs).

Data storage device 902 and memory 903 each comprise a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 904 may include a display device such as a cathode ray tube (CRT), plasma or liquid crystal display (LCD) monitor for displaying information to the user, a keyboard, and a pointing device such as a mouse or a trackball by which the user can provide input to computer 900.

One skilled in the art will recognize that an implementation of an actual computer or computer system may have other structures and may contain other components as well, and that FIG. 9 is a high level representation of some of the components of such a computer for illustrative purposes.

The invention claimed is:

1. A method for preemptively determining a load weight for mining excavation equipment, the method comprising:
    scanning an excavation surface to generate an excavation surface profile;
    selecting an excavation plan for the excavation surface profile;
    executing the excavation plan for the excavation surface profile on the excavation surface utilizing a pre-emptive load weighting algorithm based on a plurality of drive signals of the mining excavation equipment; and
    determining a volume of a material to be excavated by the mining excavation equipment based at least on the plurality of drive signals and the excavation surface profile.

2. The method of claim 1, wherein the scanning the excavation surface to generate an excavation surface profile comprises:
    scanning an environment surrounding the excavation surface using a plurality of sensors; and
    analyzing data generated by the plurality of sensors utilizing a pattern classification and recognition algorithm.

3. The method of claim 2, wherein the scanning an environment surrounding the excavation surface using a plurality of sensors comprises:
    determining a topography that may interfere with activity of the mining excavation equipment; and
    determining one or more objects that may interfere with activity of the mining excavation equipment.

4. The method of claim 2, wherein the pattern classification and recognition algorithm comprises at least one of:
    a decision tree;
    a Bayesian network;
    a neural network;
    a Gaussian process;
    an independent component analysis;
    a self-organized map; or
    a support vector machine.

5. The method of claim 1, wherein the selecting an excavation plan for the excavation surface profile comprises:
- searching a database containing a plurality of predetermined excavation plans for one of more excavation plans that match the excavation surface profile;
- in response to identifying the one or more excavation plans that match the excavation surface profile, calculating a likelihood of success for each of the one or more excavation plans that match the excavation surface profile against the excavation surface profile; and
- selecting an excavation plan having a highest calculated likelihood of success from the one of more excavation plans that match the excavation surface profile.

6. The method of claim 5, further comprising:
- re-assessing the excavation plan having the highest calculated likelihood of success by comparing the excavation plan having the highest calculated likelihood of success to past results from alternative digging procedures; and
- storing in the database the excavation plan having the highest calculated likelihood of success in response to determining that results of executing the excavation plan having the highest calculated likelihood of success are superior to the past results from alternative digging procedures.

7. The method of claim 5, wherein the selecting an excavation plan having a highest calculated likelihood of success from the one of more excavation plans that match the excavation surface profile comprises:
- in response to failing to identify one or more excavation plans in the database that match the excavation surface profile, generating an excavation plan based on the excavation surface profile for the excavation surface by:
  - subtracting an excavation trajectory equation from an excavation surface equation resulting in a difference equation;
  - determining intersection points of the difference equation using a quadratic formula; and
  - integrating the excavation surface with the intersection points as bounds; and
- storing the generated excavation plan in the database.

8. The method of claim 1, wherein the executing the excavation plan for the excavation surface profile on the excavation surface utilizing a pre-emptive load weighting algorithm based on a plurality of drive signals of the mining excavation equipment comprises:
- measuring the plurality of drive signals of the mining excavation equipment.

9. The method of claim 8, wherein the measuring the plurality of drive signals of the mining excavation equipment comprises:
- measuring a hoist motor torque; and
- measuring a hoist motor acceleration by comparing a first hoist motor speed associated with a first time to a second hoist motor speed associated with a second time, wherein the first time precedes the second time.

10. The method of claim 1, further comprising:
- determining a load of the material in a bucket of the mining excavation equipment while the bucket is within the excavation surface by determining an effect of an excavating operation on at least one of the plurality of drive signals.

11. The method of claim 10, wherein the determining a load of the material in a bucket of the mining excavation equipment while the bucket is within the excavation surface comprises:
- determining a position of the mining excavation equipment with respect to the excavation surface;
- determining a derivative of a hoist motor speed;
- determining a hoist position;
- determining a crowd position; and
- determining a position of the bucket.

12. The method of claim 10, wherein the determining a load of the material in a bucket of the mining excavation equipment while the bucket is within the excavation surface further comprises:
- determining a decrease in the hoist motor speed relative to an amount of the material in the bucket of the mining excavation equipment while excluding a plurality of stall conditions based on determining a penetration depth into the excavation surface by the bucket.

13. The method of claim 1, further comprising:
- determining an additional load of the material in the bucket of the mining excavation equipment as a consequence of the material falling into the bucket.

14. The method of claim 13, wherein the determining an additional load of the material in the bucket of the mining excavation equipment comprises:
- detecting, by a scanner, the material falling into the bucket; and
- detecting an additional increase of the material in the bucket.

15. An apparatus for preemptively determining a load weight for mining excavation equipment, the apparatus comprising:
- means for scanning an excavation surface to generate an excavation surface profile;
- means for selecting an excavation plan for the excavation surface profile;
- means for executing the excavation plan for the excavation surface profile on the excavation surface utilizing a pre-emptive load weighting algorithm based on a plurality of drive signals of the mining excavation equipment; and
- means for determining a volume of a material to be excavated by the mining excavation equipment based at least on the plurality of drive signals and the excavation surface profile.

16. The apparatus of claim 15, wherein the means for selecting an excavation plan for the excavation surface profile comprises:
- means for searching a database containing a plurality of predetermined excavation plans for one of more excavation plans that match the excavation surface profile;
- means for, in response to identifying the one or more excavation plans that match the excavation surface profile, calculating a likelihood of success for each of the one or more excavation plans that match the excavation surface profile against the excavation surface profile; and
- means for selecting an excavation plan having a highest calculated likelihood of success from the one of more excavation plans that match the excavation surface profile.

17. The apparatus of claim 16, further comprising:
- means for re-assessing the excavation plan having the highest calculated likelihood of success by comparing the excavation plan having the highest calculated likelihood of success to past results from alternative digging procedures; and
- means for storing in the database the excavation plan having the highest calculated likelihood of success in response to determining that results of executing the excavation plan having the highest calculated likelihood of success are superior to the past results from alternative digging procedures.

18. The apparatus of claim 16, wherein the means for selecting an excavation plan having a highest calculated likelihood of success from the one of more excavation plans that match the excavation surface profile comprises:
   in response to failing to identify one or more excavation plans in the database that match the excavation surface profile, means for generating an excavation plan based on the excavation surface profile for the excavation surface by:
      subtracting an excavation trajectory equation from an excavation surface equation resulting in a difference equation;
      determining intersection points of the difference equation using a quadratic formula; and
      integrating the excavation surface with the intersection points as bounds; and
   means for storing the generated excavation plan in the database.

19. The apparatus of claim 15, further comprising:
   means for determining a load of the material in a bucket of the mining excavation equipment while the bucket is within the excavation surface by determining an effect of an excavating operation on at least one of the plurality of drive signals.

20. The apparatus of claim 15, further comprising:
   means for determining an additional load of the material in the bucket of the mining excavation equipment as a consequence of the material falling into the bucket.

* * * * *